United States Patent
Li

(10) Patent No.: US 11,132,123 B2
(45) Date of Patent: Sep. 28, 2021

(54) KEY DISPLAY METHOD, TERMINAL, AND NON-TRANSITORY COMPUTER-READABLE MEDIUM

(71) Applicant: GUANGDONG OPPO MOBILE TELECOMMUNICATIONS CORP., LTD., Guangdong (CN)

(72) Inventor: Hong Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/811,649

(22) Filed: Mar. 6, 2020

(65) Prior Publication Data

US 2020/0210064 A1 Jul. 2, 2020

Related U.S. Application Data

(63) Continuation of application No. PCT/CN2017/101131, filed on Sep. 8, 2017.

(51) Int. Cl.
*G06F 3/0488* (2013.01)
*G06F 9/451* (2018.01)
(Continued)

(52) U.S. Cl.
CPC ........ *G06F 3/04886* (2013.01); *G06F 3/0482* (2013.01); *G06F 9/451* (2018.02);
(Continued)

(58) Field of Classification Search
CPC ............... G06F 3/04886; G06F 3/0482; G06F 2203/04803; H04N 1/00411; H04N 5/232; H04M 1/72403
See application file for complete search history.

(56) References Cited

U.S. PATENT DOCUMENTS

2013/0076649 A1 3/2013 Myers et al.
2015/0227227 A1* 8/2015 Myers .................. G06F 1/1643
345/173
(Continued)

FOREIGN PATENT DOCUMENTS

CN 104281405 A 1/2015
CN 104866287 A 8/2015
(Continued)

OTHER PUBLICATIONS

International Search Report for International Application No. PCT/CN2017/101131 dated Apr. 4, 2018.
(Continued)

*Primary Examiner* — Gerald Johnson
(74) *Attorney, Agent, or Firm* — Young Basile Hanlon & MacFarlane, P.C.

(57) ABSTRACT

A key display method, a terminal, and a non-transitory computer-readable medium. The method includes: displaying a first user interface and a navigation bar, the navigation bar including a target virtual key; receiving a first operation signal; launching a target application program in response to the first operation signal; switching the first user interface to display a second user interface of the target application program, and switching the target virtual key in the navigation bar to display an image capture key.

20 Claims, 12 Drawing Sheets

(51) Int. Cl.
  *G06F 3/0482*    (2013.01)
  *H04N 5/232*     (2006.01)
  *H04M 1/72403*   (2021.01)

(52) U.S. Cl.
  CPC ........ *H04M 1/72403* (2021.01); *H04N 5/232* (2013.01); *H04M 2250/52* (2013.01)

(56) References Cited

U.S. PATENT DOCUMENTS

2016/0246488 A1    8/2016  Sassouni et al.
2017/0278546 A1*   9/2017  Xiao .................. G06T 5/00
2018/0113591 A1*   4/2018  Chen ................ G06F 3/04883
2018/0307273 A1*  10/2018  Zhu .................. G06F 1/1643

FOREIGN PATENT DOCUMENTS

CN    105487868 A    4/2016
CN    105653265 A    6/2016
CN    106293418 A    1/2017

OTHER PUBLICATIONS

Sanz Borja et al:Instance-based Anomaly Method for Android Malware Detection,2013 International Conference on Security and Cryptography (SECRYPT), Scitepress, Jul. 29, 2013, pp. 1-8.
European Search Report,European Application No. 17924346.4, dated Sep. 14, 2020 (11 pages).

* cited by examiner

KEY DISPLAY METHOD, TERMINAL, AND NON-TRANSITORY COMPUTER-READABLE MEDIUM

CROSS-REFERENCE TO RELATED APPLICATION(S)

This application is a continuation application of International Patent Application No. PCT/CN2017/101131, filed on Sep. 8, 2017, the contents of which are herein incorporated by reference in their entireties.

TECHNICAL FIELD

The present disclosure relates to the field of human-machine interaction, and in particular, to a key display method, a terminal, and a non-transitory computer-readable medium.

BACKGROUND

A shooting function is one of the most commonly used functions of a mobile terminal including such as a smartphone, a tablet computer, and the like.

When a user performs the shooting, the user opens a shooting interface on the mobile terminal. A virtual shooting key is displayed at a middle of a lower portion of the shooting interface. After the user touches the virtual shooting key, the mobile terminal controls a photosensitive element in a camera to perform the shooting.

A mobile terminal using an Android operation system also displays a navigation bar at a bottom of a touch screen. The navigation bar displays a return key, a home key, and a menu key. Since the virtual shooting key is disposed very close to the home key in location, when the user clicks the virtual shooting key, it is easy to accidentally touch the home key in the navigation bar.

SUMMARY

In some embodiments of a first aspect of the present disclosure, a key display method may be provided. The method may include: displaying a first user interface and a navigation bar, the navigation bar comprising a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

In some embodiments of a second aspect of the present disclosure, a terminal may be provided. The terminal may include a processor and a non-transitory memory; the non-transitory memory is configured to store at least one instruction which, when loaded and executed by the processor, perform a key display method including: displaying a first user interface and a navigation bar, the navigation bar comprising a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

In some embodiments of a third aspect of the present disclosure, a non-transitory computer-readable medium may be provided. The non-transitory computer-readable medium may store at least one instruction which, when loaded and executed by the processor to perform a key display method including: displaying a first user interface and a navigation bar, the navigation bar comprising a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

BRIEF DESCRIPTION OF DRAWINGS

In order to describe technical solutions of embodiments of the present disclosure more clearly, drawings required for the description of the embodiments will be briefly introduced below. Apparently, the drawings in the following description are merely some embodiments of the present disclosure. For those skilled in the art, it is possible to obtain other drawings according to these drawings without paying any creative work.

DETAILED DESCRIPTION

Figure 1:
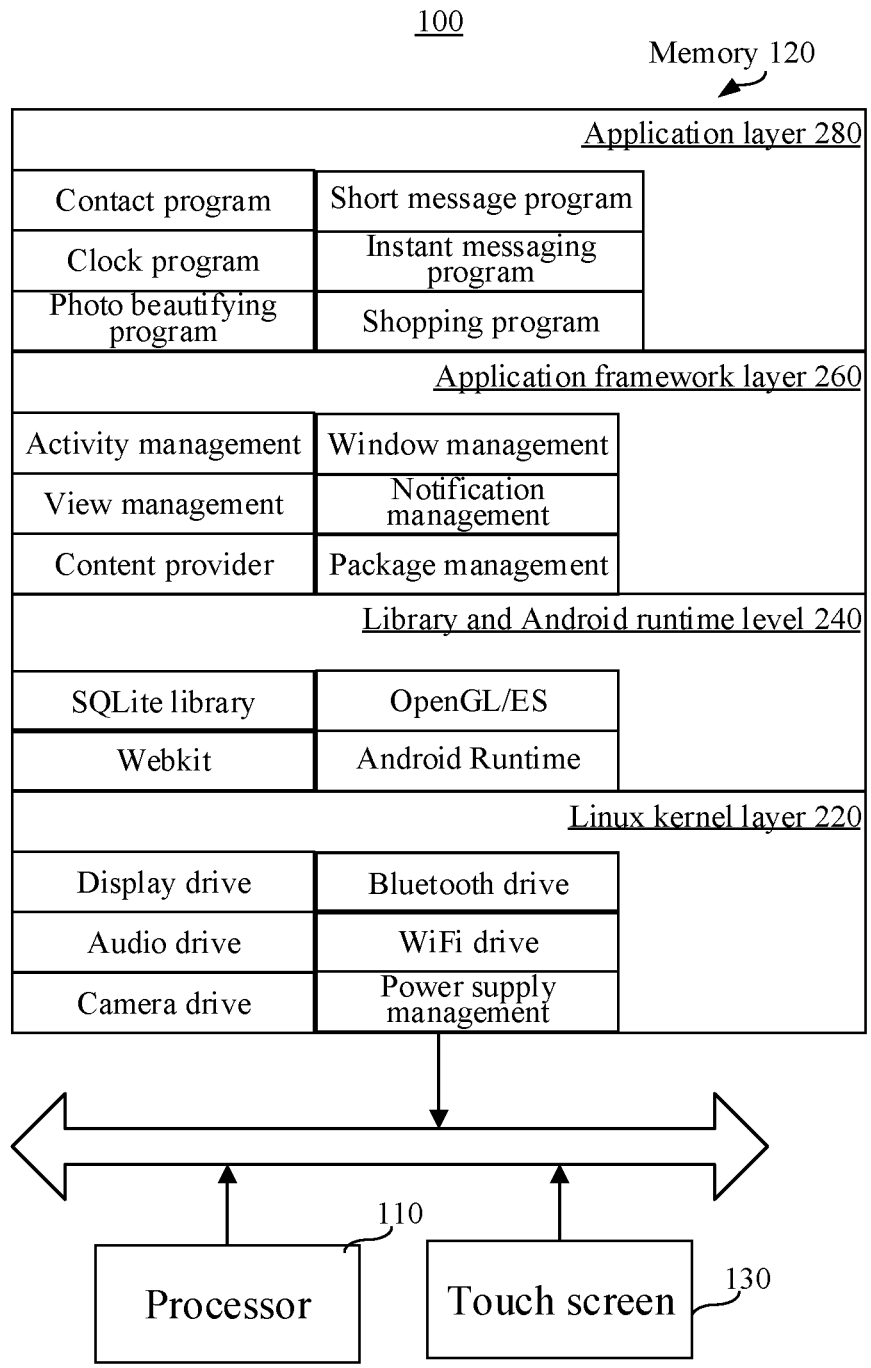
FIG. 1 is a structural block diagram of a terminal according to some embodiments of the present disclosure.

In order to make purposes, technical solutions, and advantages of some embodiments of the present disclosure clearer, embodiments of the present disclosure will be further described in detail below in accompany with drawings.

The term "module" mentioned in some embodiments of the present disclosure generally refers to programs or instructions stored in a memory and capable of performing certain functions. The term "unit" mentioned in some embodiments of the present disclosure generally refers to functional structures divided logically; the "unit" may be implemented by pure hardware, or implemented by a combination of software and hardware.

The term "a plurality of" mentioned in some embodiments of the present disclosure refers to two or more. The term "and/or" describes association relationships among associated objects, and indicates that three kinds of relationships may exist. For example, A and/or B may indicate three situations including: only A exists; both A and B exist; and only B exists. The character "/" generally indicates that previous and latter associated objects have an "or" relationship.

In some aspects, a key display method may be disclosed. The key display method may include: displaying a first user interface and a navigation bar, the navigation bar including a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

In some embodiments, after switching the target virtual key in the navigation bar to the shooting key, the method further includes: receiving a touch signal triggered by a touch operation on the shooting key; and operating the target application to perform the shooting in response to the touch signal.

In some embodiments, operating the target application to perform the shooting in response to the touch signal, includes: generating a pending intent message in response to the touch signal; and sending the pending intent message to the target application; wherein the pending intent message is configured to trigger the target application to start the shooting.

In some embodiments, before switching the target virtual key in the navigation bar to the shooting key, the method further includes: in response to detecting that an application is launched, reading a manifest file of the launched application; and in response to a camera attribute existing in the manifest file, determining that the launched application is the target application. Switching the target virtual key in the navigation bar to the shooting key, includes: switching the target virtual key in the navigation bar to the shooting key in response to the launched application being the target application, or switching the target virtual key in the navigation bar to the shooting key in response to the launched application being the target application and a foreground interface of the target application being a shooting interface.

In some embodiments, displaying the second user interface of the target application includes: in response to the target application being a camera application, directly switching the first user interface to the second user interface.

In some embodiments, after switching the target virtual key in the navigation bar to the shooting key, the method further includes: receiving a second operation signal; exiting the target application in response to the second operation signal; and switching the shooting key in the navigation bar back to the target virtual key.

In some embodiments, the navigation bar includes a return key, a home key, and a menu key, and the target virtual key is the home key or the menu key. Receiving the second operation signal includes: receiving the second operation signal of the return key.

In some embodiments, displaying the second user interface of the target application includes: removing a region of the first user interface and display the second user interface in the region; and exiting the target application in response to the second operation signal includes: switching a shooting interface back to a home screen.

In some embodiments, switching the target virtual key in the navigation bar to the shooting key, includes: removing the target virtual key in the navigation bar and displaying the shooting key at a position at which the target virtual key is located before removal; or keeping a displaying state of the target virtual key in the navigation bar unchanged, and switching a code logic configured to respond to the target virtual key to a code logic configured to respond to the shooting key.

In some aspects, a terminal may be further provided. The terminal may include a processor and a non-transitory memory. The non-transitory memory is configured to store at least one instruction which, when loaded and executed by the processor, perform a key display method including: displaying a first user interface and a navigation bar, the navigation bar including a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

In some embodiments, after switching the target virtual key in the navigation bar to the shooting key, the method further includes: receiving a touch signal triggered by a touch operation on the shooting key; and operating the target application to perform the shooting in response to the touch signal.

In some embodiments, operating the target application to perform the shooting in response to the touch signal, includes: generating a pending intent message in response to the touch signal; and sending the pending intent message to the target application; wherein the pending intent message is configured to trigger the target application to start the shooting.

In some embodiments, before switching the target virtual key in the navigation bar to the shooting key, the method further includes: in response to detecting that an application is launched, reading a manifest file of the launched application; and in response to a camera attribute existing in the manifest file, determining that the launched application is the target application. Switching the target virtual key in the navigation bar to the shooting key, includes: switching the target virtual key in the navigation bar to the shooting key in response to the launched application being the target application, or switching the target virtual key in the navigation bar to the shooting key in response to the launched application being the target application and a foreground interface of the target application being a shooting interface.

In some embodiments, after switching the target virtual key in the navigation bar to the shooting key, the method further includes: receiving a second operation signal; exiting the target application in response to the second operation signal; and switching the shooting key in the navigation bar back to the target virtual key.

In some embodiments, the navigation bar includes a return key, a home key and a menu key, and the target virtual key is the home key or the menu key; receiving the second operation signal includes: receiving the second operation signal of the return key.

In some embodiments, displaying the second user interface of the target application includes: removing a region of the first user interface and display the second user interface in the region; and exiting the target application in response to the second operation signal includes: switching a shooting interface back to a home screen.

In some embodiments, switching the target virtual key in the navigation bar to the shooting key, includes: removing the target virtual key in the navigation bar and displaying the shooting key at a position at which the target virtual key is located before removal; or keeping a displaying state of the target virtual key in the navigation bar unchanged, and switching a code logic configured to respond to the target virtual key to a code logic configured to respond to the shooting key.

In some aspects, a non-transitory computer-readable medium may be provided. The non-transitory computer-readable medium may store at least one instruction which, when loaded and executed by the processor to perform a key display method including: displaying a first user interface and a navigation bar, the navigation bar including a target virtual key; receiving a first operation signal; launching a target application in response to the first operation signal, the target application having a shooting function; and displaying a second user interface of the target application, and switching the target virtual key in the navigation bar to a shooting key; wherein the shooting key is configured to trigger the target application to perform shooting.

In some embodiments, after switching the target virtual key in the navigation bar to the shooting key, the method further includes: receiving a touch signal triggered by a touch operation on the shooting key; and operating the target application to perform the shooting in response to the touch signal. Operating the target application to perform the shooting in response to the touch signal, includes: generating a pending intent message in response to the touch signal; and sending the pending intent message to the target application; wherein the pending intent message is configured to trigger the target application to start the shooting.

In some embodiments, before switching the target virtual key in the navigation bar to the shooting key, the method further includes: in response to detecting that an application is launched, reading a manifest file of the launched application; and in response to a camera attribute existing in the manifest file, determining that the launched application is the target application. Switching the target virtual key in the navigation bar to the shooting key, includes: switching the target virtual key in the navigation bar to the shooting key in response to the launched application being the target application, or switching the target virtual key in the navigation bar to the shooting key in response to the launched application being the target application and a foreground interface of the target application being a shooting interface.

Figure 2:
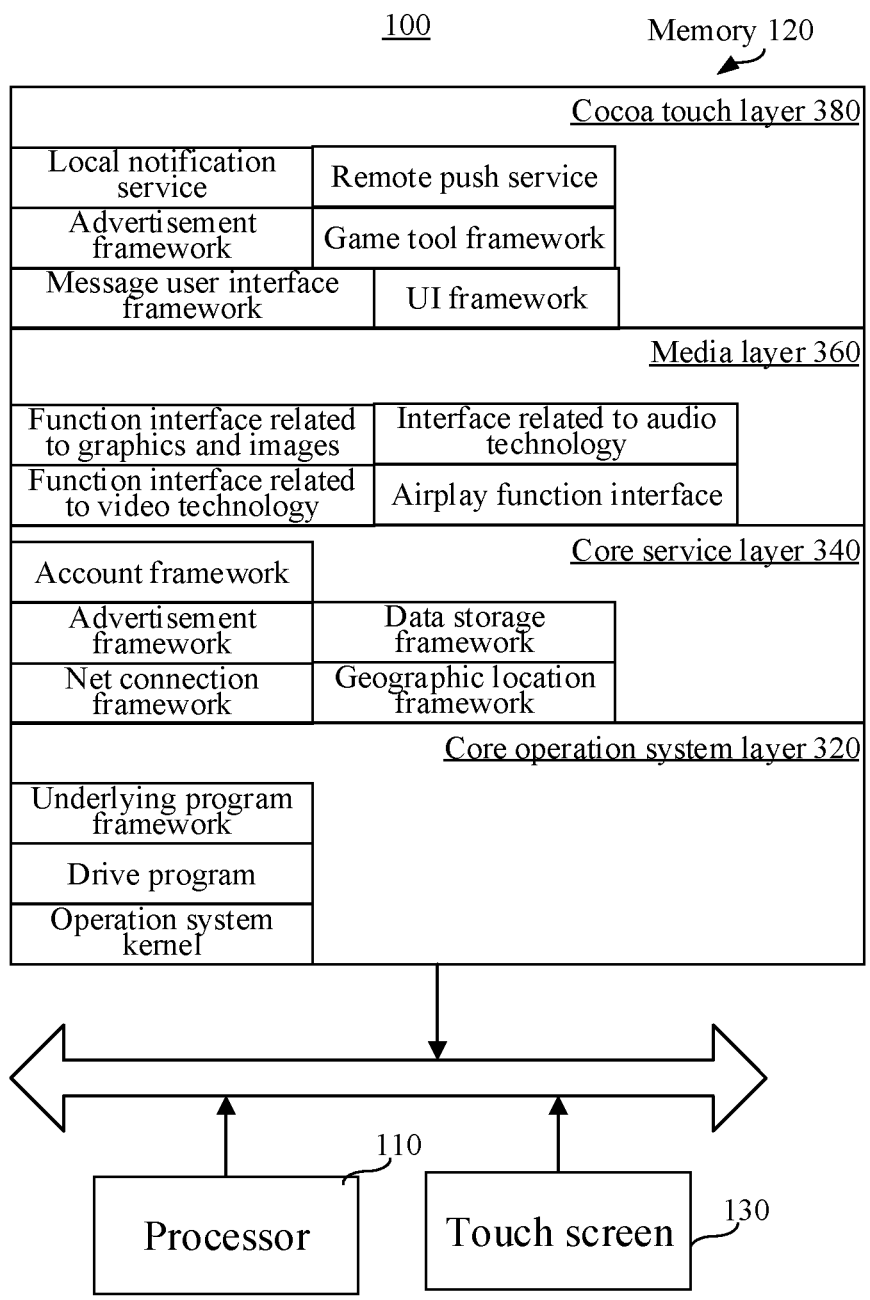
FIG. 2 is a structural block diagram of a terminal according to some embodiments of the present disclosure.

FIG. 1 and FIG. 2 show structural block diagrams of a terminal 100 according to some embodiments of the present disclosure. The terminal 100 may be a mobile phone, a tablet computer, a laptop, an electronic book, and the like. The terminal 100 according to some embodiments of the present disclosure may include at least one of: a processor 110, a memory 120, and a touch screen 130.

The processor 110 may include one or more processing cores. The processor 110 may be connected to various internal components of the terminal 100 by means of various interfaces and wires, and execute various functions of the terminal 100 and process data by running or executing an instruction, a program, a code set, or an instruction set stored in the memory 120 and by calling data stored in the memory 120. In some embodiments, the processor 110 may implemented by at least one kind of hardware in form of: a digital signal processing (DSP), a field-programmable gate array (FPGA), and a programmable logic array (PLA). The processor 110 may integrate one or a combination of a central processing unit (CPU), a graphics processing unit (GPU), a modem, and the like. In some embodiments, the CPU may be substantially configured to process an operation system, a user interface, an application program, and the like. The GPU may be configured to be render and draw content to be displayed on the touch screen 130. The modem may be configured to process wireless communication. It may be understood that, it is also possible that the modem is not integrated into the processor 110, but may be implemented independently by a single chip.

The memory 120 may include a random access memory (RAM), and may also include a read-only memory. In some embodiments, the memory 120 may include a non-transitory computer-readable storage medium. The memory 120 may be configured to store the instruction, the program, the code, the code set, or the instruction set. The memory 120 may include a program storage area and a data storage area. In some embodiments, the program storage area may store an instruction for achieving the operation system, an instruction for achieving at least one function (such as touching, audio playing, image playing, and the like), an instruction for performing the following method embodiments, and the like. The data storage area may be configured to store data created according to the usage of the terminal 100 (such as audio data, phone book), and the like.

Taking an Android system as an example, the program and the data stored in the memory 120 may be shown in FIG. 1. The memory 120 may be configured to store a Linux kernel layer 220, a library and Android runtime level 240, an application framework layer 260, and an application layer 280. The Linux kernel layer 220 may be configured to provide underlying drives (such as a display drive, an audio drive, a camera drive, a Bluetooth drive, a Wireless-Fidelity (Wi-Fi) drive, power management) to various hardware of the terminal 100. The library and Android runtime level 240 may provide a feature support for the Android system via some C/C++ libraries. For example, an SQLite library may provide a support for a database, an OpenGL/ES library may provide a support for three-dimensional drawing, a Webkit library may provide a support for a browser kernel, and the like. The library and Android runtime level 240 may further include an Android Runtime. The Android Runtime may provide some core libraries allowing a developer to program an Android application by means of Java language. The application framework layer 260 may provide various application programming interface (API) that may be used when establishing application programs. The developer, by using these APIs, may also establish his or her own application programs, such as activity management, window management, view management, notification management, a content provider, package management, call management, resource management, and positioning management. At least one application program may run in the application layer 280. The at least one application program may include a program originally built or installed in an operation system, such as a contact program, a short message program, a clock program, a camera application, and the like. The application program may also include an application program developed by a third party developer, such as an instant messaging program, an image retouching program, and the like.

Taking an iPhone operation system (iOS) system as an example, the program and data stored in the memory 120 may be shown in FIG. 2. The iOS system may include: a core operation system (OS) layer 320, a core service layer 340, a media layer 360, and a cocoa touch layer 380. The core OS layer 320 may include an OS kernel, a drive program, and an underlying program framework. The underlying program framework may provide functions similar to functions of hardware, and the underlying program framework may be used by a program framework in the core service layer 340. The core service layer 340 may provide an application programs with a required system service and/or the application framework, such as a foundation framework, an account framework, an advertisement framework, a data storage framework, a network connection framework, a geographic location framework, a motion framework, and the like. The media layer 360 may provide the application program with an interface related to visual and audio aspects. The interface may include such as an interface related to graphics and images, an interface related to audio technology, an interface related to video technology, an airplay interfaces of audio-video transmission technology, and the like. The cocoa touch layer 380 may provide various frameworks related to various commonly-used interfaces for application program development, and responsible for touch interaction operations performed by a user on the terminal 100, such as a local notification service, a remote push service, an advertisement framework, a game tool framework, a message user interface (UI) framework, a user interface UIKit framework, a map framework, and the like.

In the frameworks shown in FIG. 2, the frameworks related to most of the application programs may include, but be not limited to: the foundation framework in the core service layer 340 and the UIKit framework in the cocoa touch layer 380. The foundation framework may provide various foundational object classes and data types, and may provide foundational system services for all application programs, which is irrelevant with the UI. A class provided by the UIKit framework may be a foundational UI class library configured to establish a touchable UI. An application program of iOS may provide the UI based on the UIKit framework. Therefore, the UIKit framework may provide a foundational framework for the application programs, and may be configured to establish the UI, to draw, to process an event interacting with the user, to responds to a gesture, and the like.

The touch screen 130 may be configured to receive a touch operation performed on or near the display screen by the user by using any suitable object, such as a finger, a touch pen, and the like. The touch screen 130 may be further configured to display the user interfaces of various application programs. The touch screen 130 may be commonly disposed on a front panel of the terminal 100. The touch screen 130 may be designed to be a full screen, a curved screen, or an anomalous screen. The touch screen 130 may also be designed to be a combination of a full-screen and a curved screen, or a combination of an anomalous screen and a curved screen, and will not be limited by the present disclosure.

Full Screen

Figure 3A:
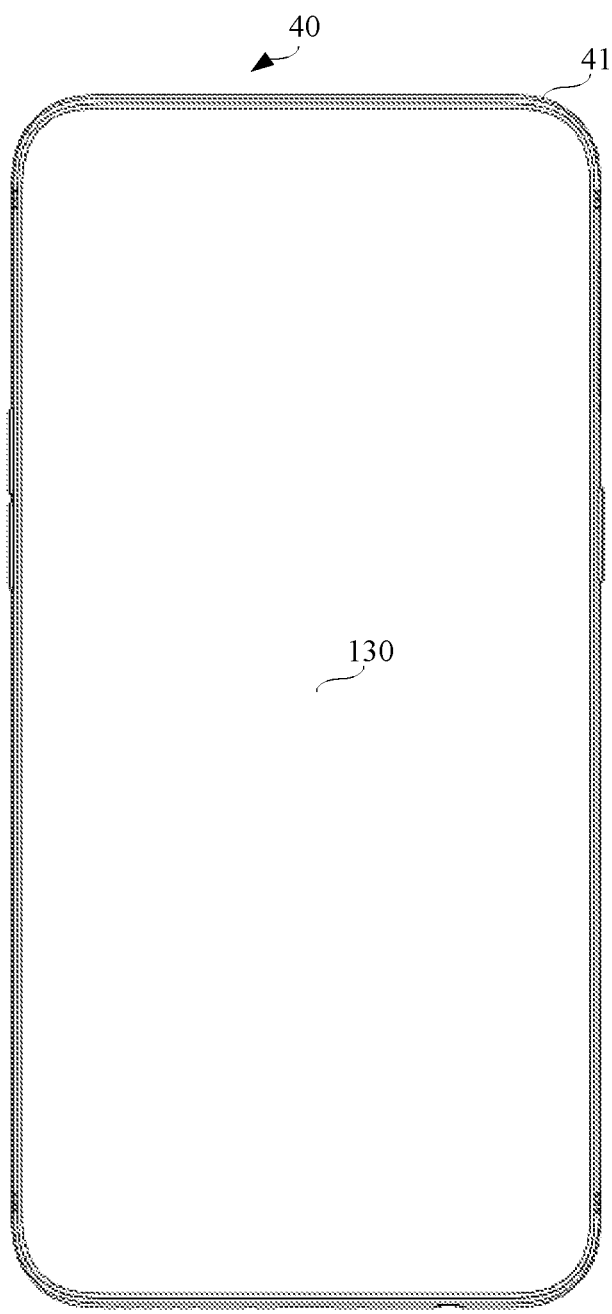
FIGS. 3A-3E are schematic appearance views of a terminal according to some embodiments of the present disclosure.

The full screen may refer to a screen having a screen-to-body ratio of the touch screen 130 to the front panel of the terminal 100 greater than a threshold value (such as 80%, 90%, or 95%). In some embodiments, the screen-to-body ratio may be calculated as follow:(an area of the touch screen 130/an area of the front panel of the terminal 100) *100%. In some embodiments, the screen-to-body ratio may also be calculated as follow:(an area of an actual display region of the touch screen 130/the area of the front panel of the terminal 100)*100%. In some embodiments, the screen-to-body ratio may also be calculated as follow:(a length of a diagonal of the touch screen 130/a length of a diagonal of the front panel of the terminal 100)*100%. According to some examples provided in FIG. 3A, almost an entire area of the front panel of the terminal 100 is covered by the touch screen 130. On the front panel 40 of the terminal 100, all areas, excluding an edge defined by a middle frame 41, may be occupied by the touch screen 130. Four corners of the touch screen 130 may have right angles or fillets.

The full screen may also be a screen having at least one front-panel component integrated in or under the touch screen 130. In some embodiments, the at least one front-panel component may include: a camera, a fingerprint sensor, a proximity light sensor, a distance sensor, and the like. In some embodiments, other components arranged on the front panel of a conventional terminal may be integrated in all or a part of the region of the touch screen panel 130. For example, the photosensitive element of the camera may be divided into a plurality of photosensitive pixels, and each photosensitive pixel may be integrated in a black region of each display pixel of the touch screen 130. Since the at least one front-panel component is integrated inside the touch screen 130, the full screen may have a higher screen-to-body ratio.

Of course, in other embodiments, the at least one front-panel component on the front panel of the conventional terminal may also be arranged at a side or a back of the terminal 100. For example, an ultrasound fingerprint sensor may be arranged under the touch screen 130, a bone conduction earpiece may be arranged inside the terminal 100, and the camera may be a structure located at the side of the terminal and arranged as being pluggable.

In some embodiments, in case that the terminal 100 adopts the full screen, one side, two sides (such as a left side and a right side), or four sides (such as upper, lower, left, and right sides) of the middle frame of the terminal 100 may be arranged with an edged touch sensor 120 (that is, a touch sensor arranged on an edge of the terminal device 100). The edged touch sensor 120 may be configured to detect at least one of the touch operation, a clicking operation, a pressing operation, a sliding operation, and the like performed by the user on the middle frame. The edged touch sensor 120 may be any of a touch sensor, a thermal sensor, a pressure sensor, and the like. The user may perform operations on the edged touch sensors 120 to control the application programs in the terminal 100.

Curved Screen

Figure 3B:
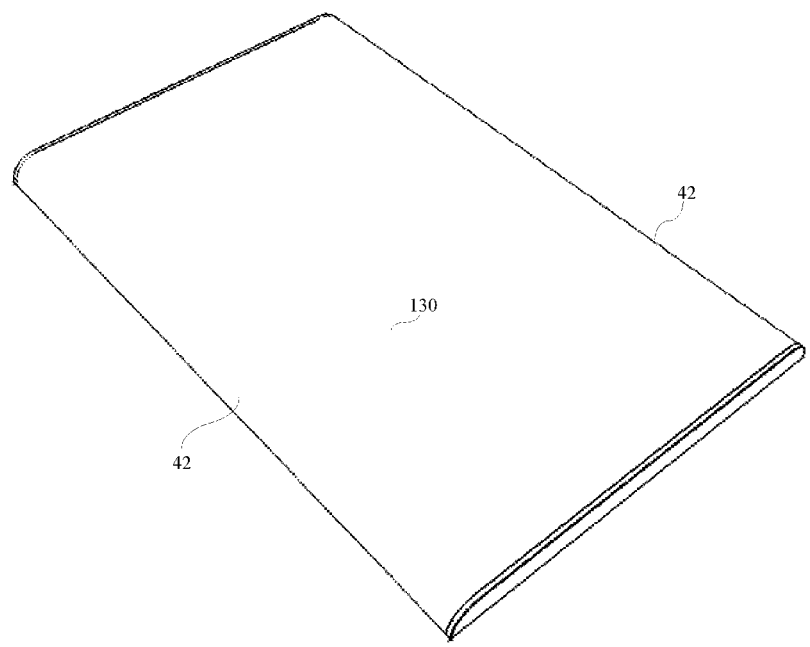

For the curved screen, the touch screen 130 may have a curved cross section. A projection of the curved screen along a direction parallel to the cross section may be a flat plane. The curved cross section may be U-shaped. In some embodiments, at least one side edge of the curved screen may be curved. In some embodiments, at least one side edge of the curved touch screen 130 may extend to cover the middle frame of the terminal device 100. In this way, since the at least one side edge of the curved touch screen 130 extend to cover the middle frame of the terminal device 100, the middle frame, which may initially be unable to display and unable to be responsive to the touch operation, may be covered by the curved touch screen 130 to form a display region and/or an operable region, such that the curved screen may have a higher screen-to-body ratio. In some embodiments, as shown in FIG. 3B, the left side and the right side 42 of the touch screen may be curved. In some embodiments, the top side and the bottom side of the touch screen may be curved. In some embodiments, the top side, the bottom side, the left side, and the right side of the touch screen may be curved. In some embodiments, the touch screen may be made of flexible material.

Anomalous Screen

For the anomalous screen, a shape of the touch screen may be irregular, and an irregular shape may not include a rectangle or a rounded rectangle. In some embodiments, the anomalous screen may refer to a rectangular or a rounded rectangular touch screen 130 having a protrusion, a notch, and/or defining a hole. In some embodiments, the protrusion, the notch, and/or the hole may be arranged or defined at the edge and/or in a center of the touch screen 130. When the protrusion, the notch, and/or the hole arranged or defined at the edge of the touch screen 130, the protrusion, the notch, and/or the hole may be arranged or defined at middle or two ends of the edge. When the protrusion, the notch, and/or the hole arranged or defined in a center of the touch screen 130, the protrusion, the notch, and/or the hole may be arranged or defined in at least one of a top region, a left top region, a left region, a left bottom region, a bottom region, a right bottom region, a right region, and a right top region. When the protrusion, the notch, and/or the hole is arranged or defined in various regions, the protrusion, the notch, and/or the hole may be arranged concentratedly or distributed dispersedly. The e protrusion, the notch, and/or the hole may be distributed symmetrically or asymmetrically. In some embodiments, the number of the protrusions, the number of the notches, and the number of the holes may not be limited by the present disclosure.

Since the anomalous screen may cover an upper region and a bottom region of the touch screen, allowing the upper and bottom regions to display and/or to receive operations, the area occupied of the front plate of the terminal device by the touch screen may be increased, and thus the anomalous region may have a greater screen-to-body ratio. In some embodiments, the notch and/or the hole may be defined to receive the at least one front-panel component. The at least one front-panel component may include at least one of the camera, the fingerprint sensor, the proximity light sensor, the distance sensor, a receiver, an ambient light sensor, and a physical button.

Figure 3C:
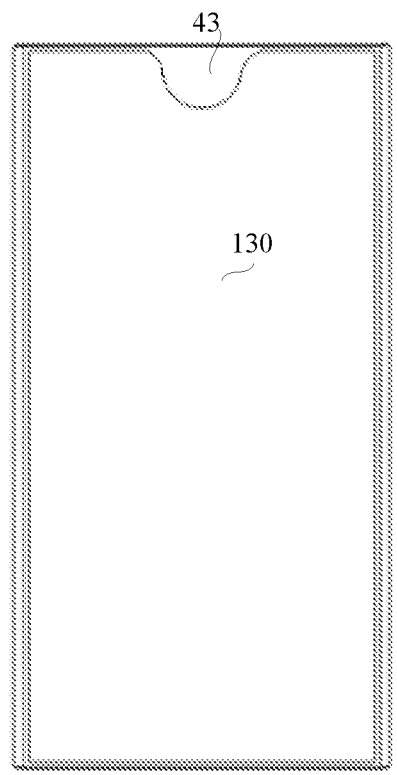
Figure 3D:
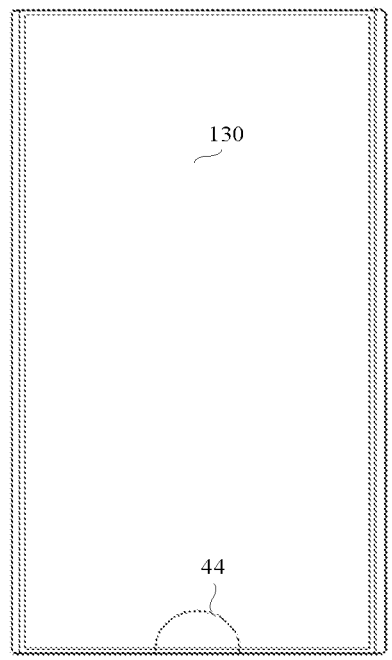
Figure 3E:
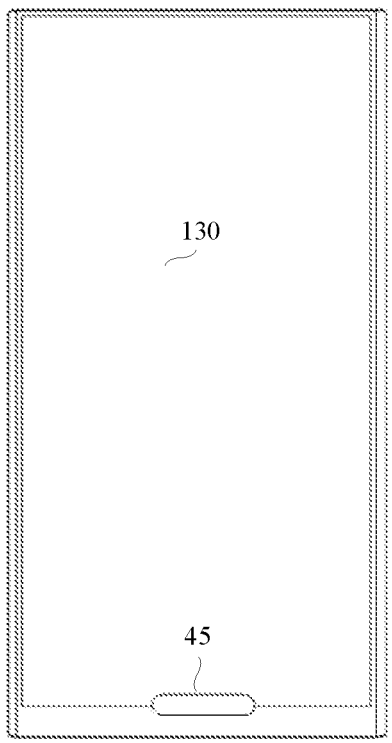

For example, the notch may be defined on one or more edges. The notch may be a semicircular notch, a rectangular notch with a right angle, a rounded rectangular notch, or an irregular notch. In some embodiments as shown in FIG. 3C, the anomalous screen may refer to the touch screen 130 defining the semicircular notch 43 at a middle of the top edge. The notch 43 may be defined to receive the at least one front-panel component. The front-panel component may include at least one of the camera, the distance sensor (also referred as a proximity sensor), the receiver, and the ambient light sensor. In some embodiments as shown in FIG. 3D, the anomalous screen may refer to a touch screen 130 defining the semicircular notch 44 at a middle of the bottom edge. The semicircular notch 44 may be defined to receive at least one of the physical button, the fingerprint sensor, and a microphone. In some embodiments as shown in FIG. 3E, the anomalous screen may refer to the touch screen 130 defining a half-elliptical notch 45 at a middle of the bottom edge and defining an additional half-elliptical notch on the front panel of the terminal device 100. A side wall of the half-elliptical notch 45 and a side wall of the additional half-elliptical notch may be combined to form an elliptical region to receive the physical button or the fingerprint sensor. In some embodiments as shown in FIG. 3F, the anomalous screen may refer to the touch screen 130 defining a hole 45 at a top. The hole 45 may be defined to receive the at least one front-panel components selected from the group consisting of the camera, the distance sensor, the receiver, and the ambient light sensor.

Furthermore, it may be understood by those skilled in the art that, a structure of the terminal device 100 as shown in the above-mentioned figures may not provide a limitation to the terminal device 100. The terminal device may be arranged with more or fewer components compared to the components shown in the figures, or arranged with combination of some components, or the components may be arranged in a different manner. For example, the terminal device 100 may further include a radio frequency circuit, an input unit, a sensor, an audio circuit, a Wi-Fi module, a power, a Bluetooth module, and the like. These may not be illustrated in details herein.

In the following, some terms involved in some embodiments of the present disclosure may be briefly introduced firstly.

Android operation system: an operation system based on Linux developed by Google in the USA. The Android operation system may be free and open-sourced, and mainly used in mobile devices.

Application program: the application program may also be called as "application" for short. In the Android operation system, an application program may usually include at least one program component. The program components may be classified into four kinds: an activity component, a service component, a content provider component, and a broadcast receiver component.

Activity component: the activity component may refer to a component configured for interaction with the user in the Android application program. One Android application program may include no activity component, or may include one or more activity components.

Service component: the service component may refer to a component running in the background and provide no user interface in the Android application program. In general, the service component may be configured to process data. One Android application program may include no service component, or may include one or more service components.

Content provide component: the content provide component may refer to a component configured to provide data to other applications or other components in a current application in the Android application program, such as a ringtone, a wallpaper, a phonebook, and the like. The content provide component may encapsulate data in various formats, and provide the data in a standard form to other applications or components for use.

Broadcast receiver component: the broadcast receiver component may be configured to receive and respond to a message broadcasted by the operation system. The broadcast receiver component may receive a message of interested (or a message having a predefined message type), and then process or forward the message to other components in the current application program.

Intent message: the intent message may be a message configured to achieve communication among various program components in the Android application program. The various program components may be different components in the same application program, and may also be different components in different application programs. The intent message may be configured to describe an action, data involved in the action, and additional data of an operation of the application program. The Android operation system may be configured to find a corresponding program component according to the description of the intent message, transmit the intent message to the called program component, and complete the calling of the program component. The intent messages may be classified into two kinds: an explicit intent message and an implicit intent message.

Explicit intent message: an intent message which explicitly points out a name of a target program component may be called as the explicit intent message. For example, an A program component needs to send an intent message "dialing a telephone number 18688888888". If the A program component expects a B program component to respond to the intent message, the A program component may assign that the target program component is the B program component in the intent message. Thus, when the Android operation system receives the intent message, the intent message may be transmitted to the B program component for further process.

Implicit intent message: an intent message which does not explicitly point out the name of the target program component may be called as the implicit intent message. For example, the A program component needs to send the intent message "dialing a telephone number 18688888888". If the A program component does not know which program component should respond to the intent message, the A program component may assign no target program component in the intent message. Thus, when the Android operation system receives the intent message, the Android operation system may check a monitored intent message types which are registered in advance by various program components. If it is checked that the B program component monitors the intent message relative to a telephone call, the Android operation system may transmit the intent message to the B program component for further process. In some embodiments, the Android operation system may broadcast the intent message, such that the broadcast receiver component interested in the intent message relative to the telephone call may receive and process the intent message.

Figure 4A:
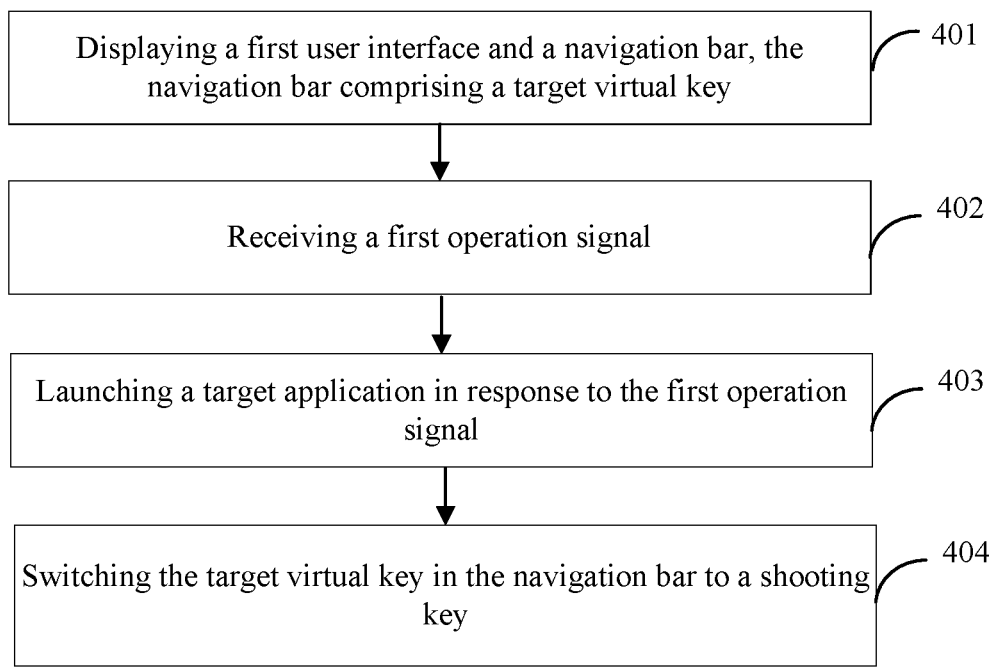
FIG. 4A is a flow chart of a key display method according to some embodiments of the present disclosure.

FIG. 4A illustrates a flow chart of a key display method according to some embodiments of the present disclosure. Some embodiments may be described by using the key display method applied to the terminal shown in FIG. 1 or FIG. 2 as an example. The method may include actions executed by the following blocks.

At block 401, a first user interface and a navigation bar may be displayed. The navigation bar may include a target virtual key.

Figure 4B:
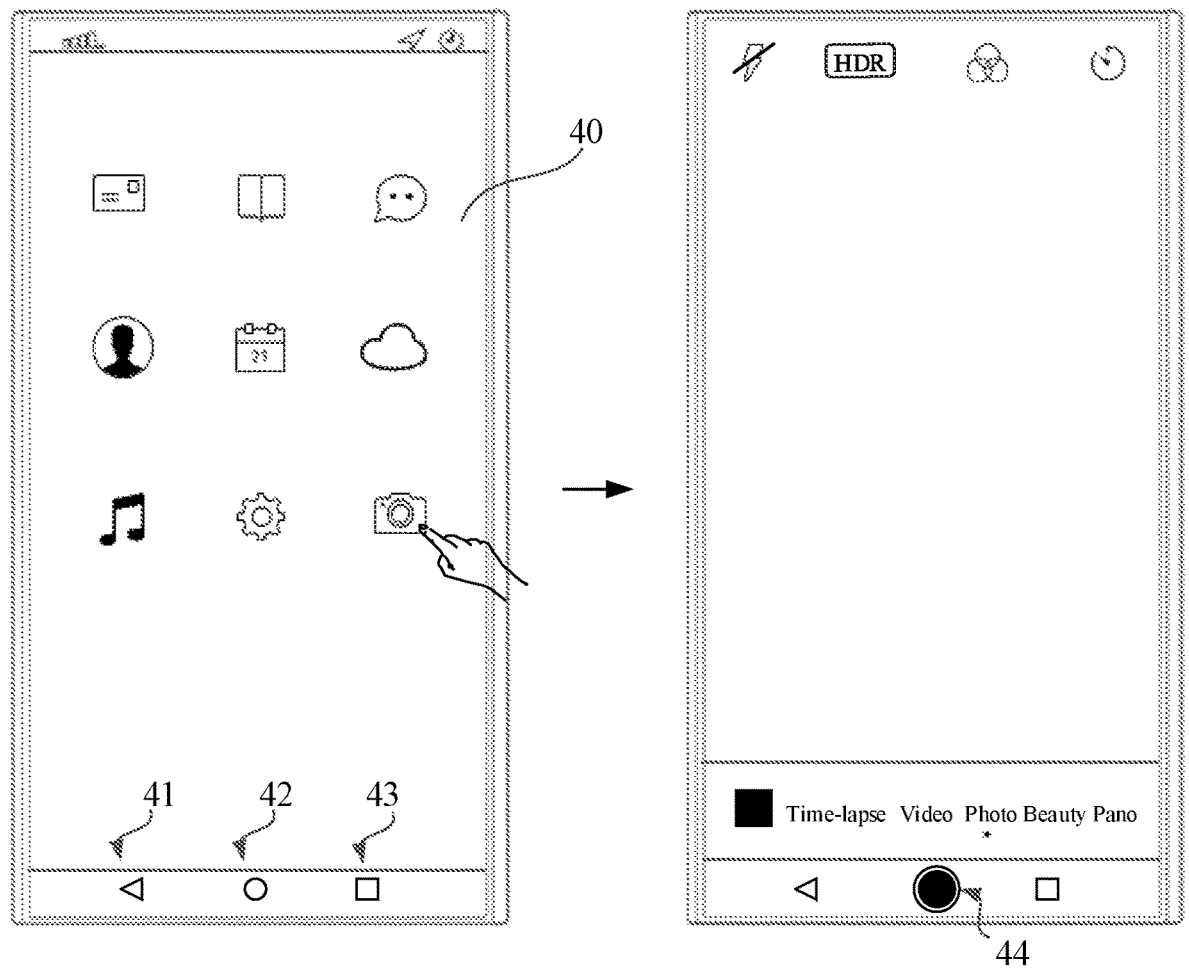
FIG. 4B is a schematic view of an interface when the key display method as illustrated in FIG. 4A is in a specific implementation.

The first user interface may be a home screen or a lock screen provided by the operation system. As shown in FIG. 4B, the first user interface 40 may occupy a middle-upper display region of the touch screen.

The navigation bar may be a control provided by the operation system and configured to display at least one virtual key. The navigation bar may be displayed in a bottom display region of the touch screen. The at least one virtual key displayed in the navigation bar may be a system virtual key. As shown in FIG. 4B, the at least one virtual key may include, but may be not limited to: a return key 41, a home key 42, and a menu key 43.

The target virtual key may be a virtual key that may be easily touched by accident. The target virtual key may be all or a part of a plurality of virtual keys displayed in the navigation bar. For example, the target virtual key may be the home key 42.

At block 402, a first operation signal may be received.

The first operation signal may be a signal configured to launch a target application. The first operation signal may be a signal generated when an operation object clicks a camera application icon, or may be a signal generated when the operation object slides up the lock screen, which may be not limited in some embodiments of the present disclosure.

At block 403, the target application may be launched in response to the first operation signal.

After receiving the first operation signal, the terminal may launch the target application. In some embodiments, the target application may have a shooting function.

In some embodiments, the target application may be a camera application. Or, the target application may be an instant messaging application having the shooting function.

At block 404, a second user interface of the target application may be displayed, and the target virtual key in the navigation bar may be switched to a shooting key.

After launching the target application, the terminal may switch all or a part of the first user interface to the second user interface of the target application. That is to say, a region of the first user interface may be switched to the second user interface, and a ratio of an area of the region to an area of the first user interface may be less than or equal to 1. In some embodiments, the second user interface may be a shooting interface or a video-recording interface.

The terminal may also switch the target virtual key in the navigation bar to the shooting key. The shooting key may be a control configured to trigger the target application to perform the shooting or perform the video-recording. The shooting key may be a virtual key, rather than a physical button.

In the examples shown in FIG. 4B, the terminal may switch to display from the home key 42 to the shooting key 44.

In summary, in the key display method provided in some embodiments of the present disclosure, after the target application is launched, the target virtual key in the navigation bar may be switched to the shooting key, such that the target virtual key that may be easily touched by accident may no longer be displayed during the shooting. In this way, the virtual key will not be touched by accident any more, the risk that the home key in the navigation bar is easily to be touched by accident when the user clicks the virtual shooting key may be reduced. Thus, it is possible to achieve an effect of reducing the probability of accidental touching during the shooting.

Figure 5A:
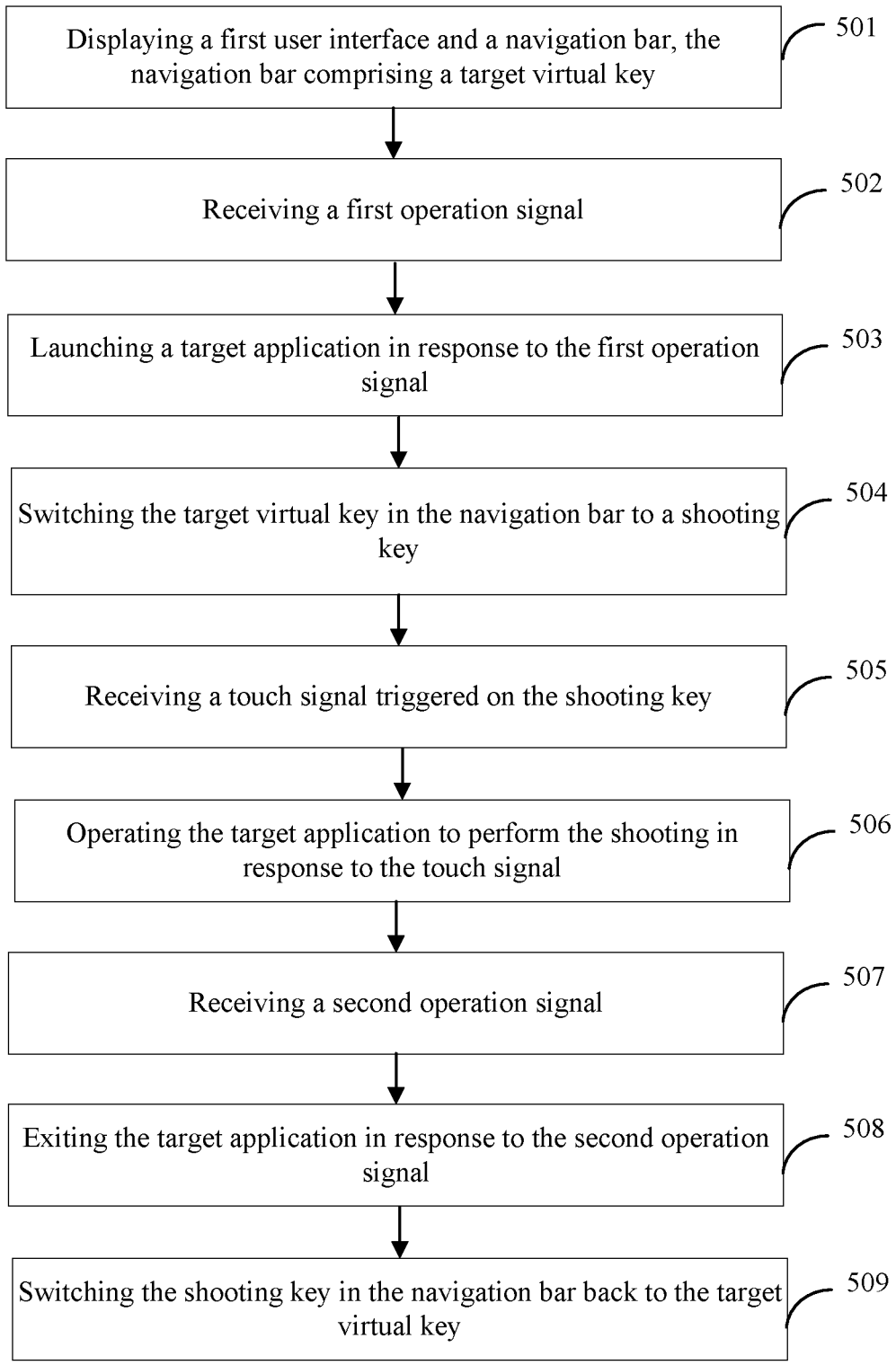
FIG. 5A is a flow chart of a key display method according to some embodiments of the present disclosure.

FIG. 5A illustrates a flow chart of a key display method according to some embodiments of the present disclosure. Some embodiments may be described by using the key display method applied to the terminal shown in FIG. 1 or 2 as an example. The method may include actions executed by the following blocks.

At block 501, a first user interface and a navigation bar may be displayed. The navigation bar may include a target virtual key.

Figure 5B:
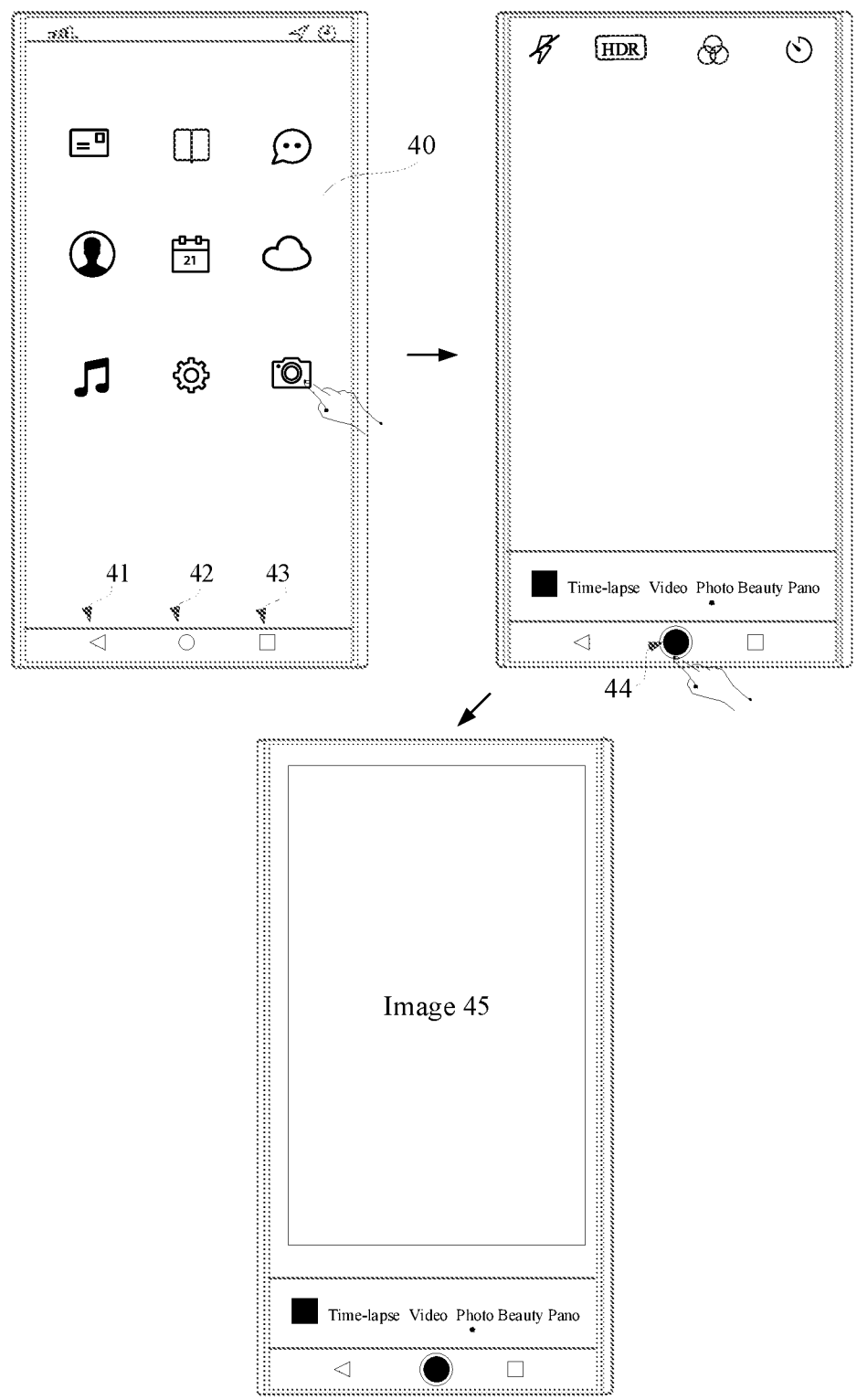
FIGS. 5B and 5C are schematic views of an interface when the key display method as illustrated in FIG. 5A is in a specific implementation.

The first user interface may be a home screen or a lock screen provided by the operation system. As shown in FIG. 5B, the first user interface 40 may occupy a middle-upper display region of the touch screen.

The navigation bar may be a control provided by the operation system and configured to display at least one virtual key. The navigation bar may be displayed in a bottom display region of the touch screen, and may also be called as a Bottom Navigation Bar. The at least one virtual key displayed in the navigation bar may be a system virtual key. As shown in FIG. 5B, the at least one virtual key may include, but be not limited to: a return key 41, a home key 42, and a menu key 43. In some embodiments, a layer of the navigation bar may be overlaid or cover on a layer of the first user interface for display of the navigation bar.

The target virtual key may be a virtual key that may be easily touched by accident. The target virtual key may be all or a part of a plurality of virtual keys displayed in the navigation bar. For example, the target virtual key may be the home key 42. For another example, the target virtual key may be the return key 41, the home key 42 and the menu key 43.

At block 502, a first operation signal may be received.

The first operation signal may be a signal configured to launch a target application. The first operation signal may be a signal generated when an operation object clicks a camera application icon, or may be a signal generated when the operation object slides up the lock screen, which may be not limited in some embodiments of the present disclosure.

At lock 503, the target application may be launched in response to the first operation signal.

After receiving the first operation signal, the terminal may launch the target application. The target application may have a shooting function.

At block 504, a second user interface of the target application may be displayed, and the target virtual key in the navigation bar may be switched to a shooting key.

In some embodiments, after launching the target application, the terminal may switch all or a part of the first user interface to display the second user interface of the target application. That is to say, a region of the first user interface may be switched to the second user interface, and a ratio of an area of the region to an area of the first user interface may be less than or equal to 1. In some embodiments, when the target application is a camera application, the first user interface may be directly switched to the second user interface.

In some embodiments, after launching the target application, if a foreground interface of the target application (that is, an interface of the target application running in the foreground) is an interface for executing the shooting function (i.e., a shooting interface), the target virtual key in the navigation bar may be switched to the shooting key. For example, when the target application is another application having the shooting function, the first user interface may be firstly switched to another interface (such as the home screen of the application) in response to launching the target application, and then switched to the second user interface under an operation of the user.

In some embodiments, the terminal may stop displaying of all or a part of the first user interface, and may display the second user interface instead. That is to say, the region of the first user interface may be removed and the second user interface may be displayed in the aforesaid region. In some embodiments, the second user interface may be the shooting interface or the video-recording interface. At this time, shooting-related control elements may be displayed on the second user interface. The control elements may include, but be not limited to at least one of: a shooting viewfinder window, a flash control, a photosensitivity control, a color temperature control, a delay control, a shooting-mode selection control, and a viewing control for a captured image.

The target virtual key may be all or a part of the virtual keys in the navigation bar. In some embodiments, the target virtual key may be the virtual key located in a centre of the navigation bar, such as the home key. In some embodiments, the target virtual key may also be the menu key or the return key, which may be not limited in some embodiments of the present disclosure.

The terminal also may switch the target virtual key in the navigation bar to the shooting key.

In some examples, the terminal may remove display of the target virtual key in the navigation bar, and display the shooting key at a position at which the target virtual key is located before removal instead. The shooting key may be a control configured to trigger the shooting or video-recording. The shooting key may be a virtual key, rather than a physical button.

In some examples, the terminal may keep a display state of the target virtual key in the navigation bar unchanged, but switch a code logic configured to respond to the target virtual key to a code logic configured to respond to the shooting key. That is to say, although the display state of the target virtual key may keep unchanged, however, the shooting function, rather than the function of the target virtual key, may be triggered when the user clicks the target virtual key.

In some examples shown in FIG. 5B, the terminal may switch the home key 42 to the shooting key 44. The shooting key 44 may occupy an original display position of the home key 42 (that is, the shooting key 44 may be disposed at a position at which the home key 42 is originally located before the home key 42 is removed), and a shape of the shooting key 44 may be different from a shape of the home key 42.

At block 505, a touch signal triggered by a touch operation on the shooting key may be received.

When the user needs to perform the shooting, the user may touch the shooting key to perform a click operation on the shooting key. After the touch screen on the terminal receives the click operation, the touch signal may be generated in response to the click operation. The touch signal may be further reported to a CPU.

At block 506, the target application may be operated to perform the shooting in response to the touch signal.

The CPU in the terminal may control or operate the target application to perform the shooting or video-recording in response to the touch signal.

At block 507, a second operation signal may be received.

The second operation signal may be a signal configured to exit the target application. The second operation signal may be a signal generated when the operation object clicks the return key, that is, the terminal may receive the second operation signal of the return key. The second operation signal may also be a signal generated when the operation object slides down the second user interface, or may be a signal generated by pressing a predetermined physical button on the terminal, which may be not limited in some embodiments of the present disclosure.

In some embodiments, when the target virtual key is the home key, the second operation signal may be a signal generated when the operation object clicks the return key. When the target virtual key is the return key, the second operation signal may be a signal generated when the operation object clicks the home key. When the target virtual key is the menu key, the second operation signal may be a signal generated when the operation object clicks the return key or the home key.

At block 508, the target application may be exited in response to the second operation signal.

After receiving the second operation signal, the terminal may exit the target application. In some embodiments, the terminal may resume display of the first user interface from the second user interface of the target application. That is to say, the terminal may switch the second user interface back to the first user interface.

At block 509, the shooting key in the navigation bar may be switched back to the target virtual key.

The terminal may resume the display of the target virtual key from the shooting key in the navigation bar. That is, the terminal may switch the shooting key in the navigation bar back to the target virtual key.

Figure 5C:
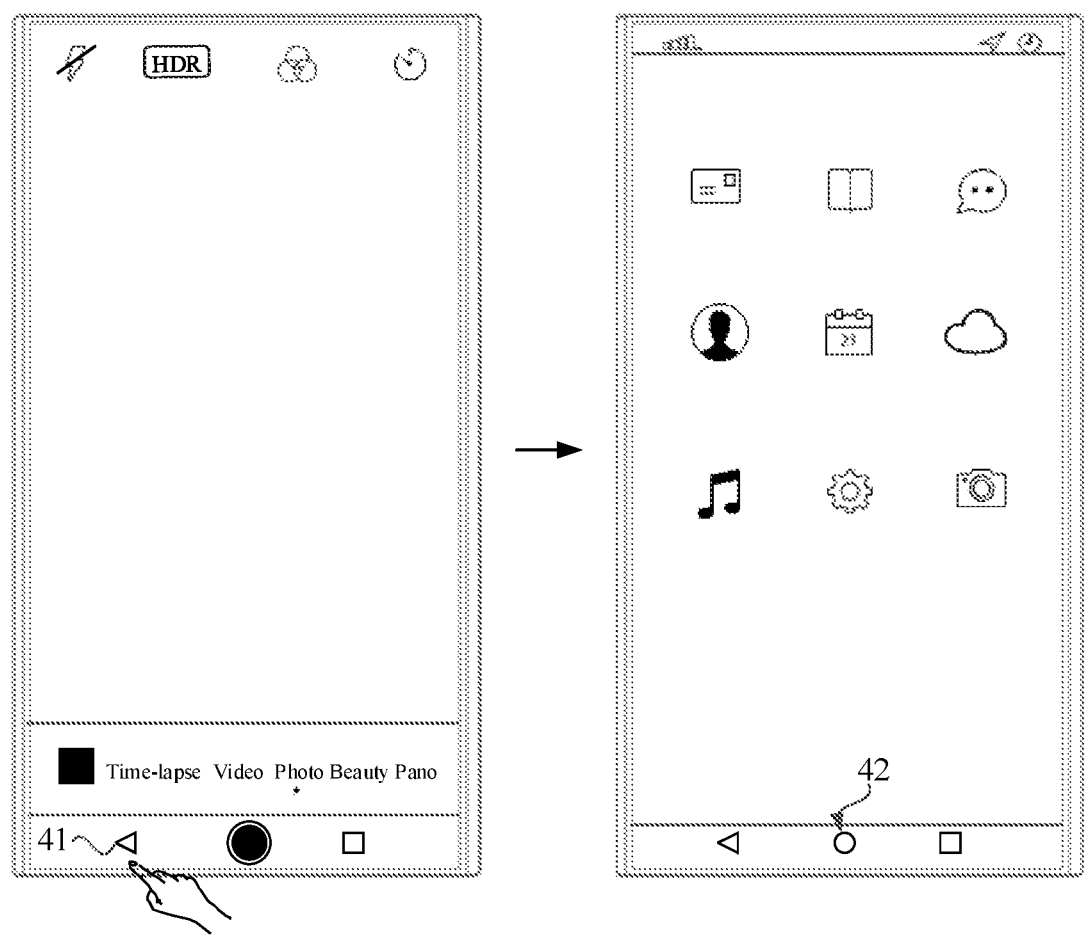

In some embodiments, when the target virtual key is the home key, the home key may be switched back to the shooting key in the navigation bar. As shown in FIG. 5C, after the user clicks the return key 41, the terminal may exit the shooting interface of the target application and switch the shooting interface back to the home screen of the operation system. At the same time or meanwhile or simultaneously, the terminal may also switch the shooting key back to the home key 42.

In summary, in the key display method provided in some embodiments of the present disclosure, after the target application is launched, the target virtual key in the navigation bar may be switched to display the shooting key, such that the target virtual key that may be easily touched by accident may no longer be displayed during the shooting. In this way, the virtual key will not be touched by accident any more, the risk that the home key in the navigation bar is easily to be touched accidentally when the user clicks the virtual shooting key may be reduced.

The conventional shooting key may occupy a larger display area in the shooting interface. However, in some embodiments of the present disclosure, after the shooting key is displayed in the navigation bar, greater display area may be saved in the shooting interface for previewing an image or displaying other shooting controls. Thus, the displayable area of the shooting interface may be increased.

In the key display method according to some embodiments of the present disclosure, after exiting the target application, the shooting key in the navigation bar may be switched to the target virtual key. In this way, after exiting the target application, normal display of the navigation bar may be resumed or restored without affecting a normal use of the navigation bar in a non-shooting scenario.

In the traditional understanding of those skilled in the art, the virtual keys in the navigation bar is the most commonly used key in human-computer interaction, such that the virtual keys in the navigation bar needs to be display continuously. In some embodiments of the present disclosure, although the home key is replaced by the shooting key such that the user cannot return back to the home screen of the operation system by pressing the home key, however, the user may return back to the home screen by pressing the return key. Therefore, the above technical solutions in some embodiments of the present disclosure may not substantially affect the normal operation of the user, and a technical prejudice made by those skilled in the art may be overcome.

Figure 6:
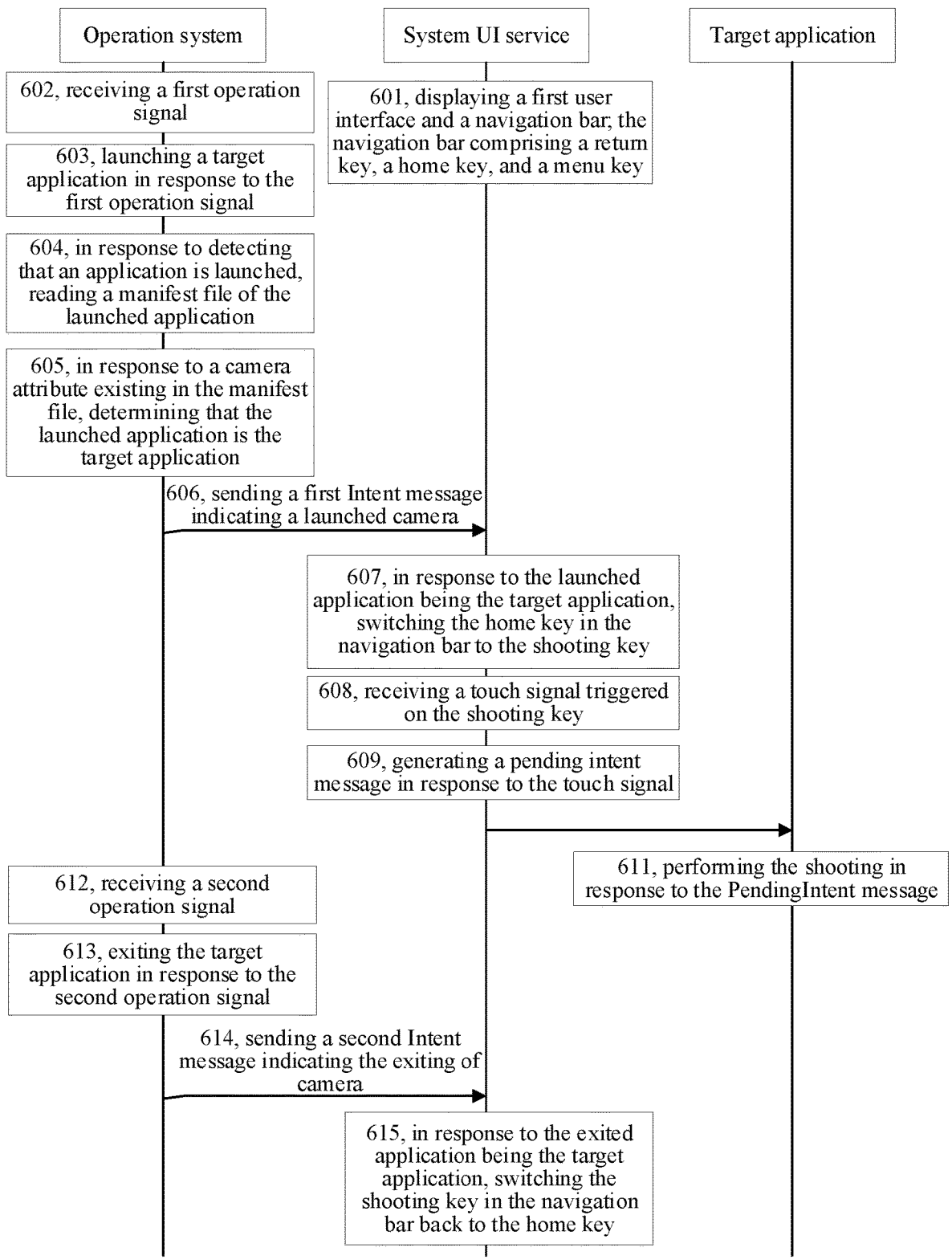
FIG. 6 is a flow chart of a key display method according to some embodiments of the present disclosure.

When the terminal utilizes the Android system and the target application is the camera application, as shown in FIG. 6, a flow chart of a key display method according to some embodiments of the present disclosure may be disclosed. When the terminal utilizes the Android system, the Android system may include: an operation system, a system user interface (UI) service, and a target application. In some embodiments, the system UI service may be a program configured to display the UI provided by the operation system. The method may include actions executed by the following blocks.

At block 601, the system UI service may display a first user interface and a navigation bar. The navigation bar may include a return key, a home key, and a menu key.

In some embodiments, the first user interface may be the home screen of the operation system, and a plurality of icons corresponding to a plurality of applications may be displayed on the home screen. The icons of the plurality of applications may include an icon of the target application.

At block 602, the operation system may receive a first operation signal.

The first operation signal may be a signal configured to launch an application. In some embodiments, the launched application may be identified by a package name of the application. At this time, the operation system cannot confirm which application is launched.

At block 603, the operation system may launch the application in response to the first operation signal.

The operation system may launch the application according to or corresponding to or in response to the package name of the application indicated by the first operation signal.

At block 604, in response to detecting that an application is launched, the operation system may read a manifest file of the launched application.

During the launching of the application, the operation system needs to read mainfest.xml of the launched application.

In some embodiments, a program file of each application in the Android system may include the manifest file mainfest.xml. The mainfest.xml file may be a configuration file of the application, and may be configured to describe information such as an attribute, an activity, and an authority of the application. A developer may pre-manifest in the manifest file mainfest.xml of the target application that a current application has a camera attribute.

At block 605, in response to the camera attribute existing in the manifest file, the operation system may determine that the launched application is the target application.

In response to the mainfest.xml of the launched application read by the operation system having the camera attribute, the operation system may determine that the launched application is the target application.

At block 606, the operation system may send a first Intent message to the system UI service. In some embodiments, the first Intent message may indicate that the camera is launched. That is, the first Intent message may indicate the target application is launched.

An Intent message may be a message configured for the communication between different program components. The operation system may send the first Intent message indicating that the camera is launched to the system UI service to inform that the target application is launched.

After receiving the first Intent message, the system UI service may determine that the target application is launched.

At block 607, in response to the launched application being the target application, the system UI service may switch the home key in the navigation bar to the shooting key.

In some embodiments, the shooting key may be displayed by the system UI service, and may be not displayed by the target application.

At block 608, the system UI service may receive a touch signal triggered by a touch operation on the shooting key.

When the user needs to shoot a picture, a touch operation may be performed on the shooting key to trigger a touch signal on the shooting key, that is, the touch signal is generated or triggered by the touch operation performed on the shooting key. Since the shooting key is displayed by the system UI service, the system UI service may receive the touch signal triggered by the touch operation on the shooting key.

At block 609, the system UI service may generate a pending intent message (PendingIntent) in response to the touch signal.

The system UI service may perform the encapsulation and acquire the PendingIntent message configured to trigger the shooting in response to the touch signal triggered on the shooting key.

The PendingIntent message may be a non-immediately executed message, that is, the system IU service may not execute the Intent message immediately, but transmit the PendingIntent message to the target application for execution.

At block 610, the system UI service may send the PendingIntent message to the target application.

At block611, the target application may perform the shooting in response to the PendingIntent message.

At block612, the operation system may receive a second operation signal.

The second operation signal may be a signal configured to exit the target application. In some embodiments, the second operation signal may be a signal of the return key. That is to say, the second operation signal may be generated by the touch operation performed on the return key.

At block 613, the operation system may exit the target application in response to the second operation signal.

At block 614, the operation system may send a second Intent message to the system UI service. The second Intent message may be configured to indicate the exiting of the camera.

The operation system may send the second Intent message configured to indicate the exiting of the camera to the system UI service, to inform that the target application is exited.

At block 615, in response to the exited application being the target application, the system UI service may switch the shooting key in the navigation bar back to the home key.

It should be noted that in some embodiments, the shooting key is displayed by the system UI service. However, in other embodiments, if the target application has the authority or ability to modify the navigation bar, the target application may also modify the target virtual key in the navigation bar to the shooting key, which may be not limited in some embodiments of the present disclosure.

The following may be apparatus embodiments according to some embodiments of the present disclosure. The parts which are not described in detail in the apparatus embodiments may refer to the technical details disclosed in the above method embodiments.

Figure 7:
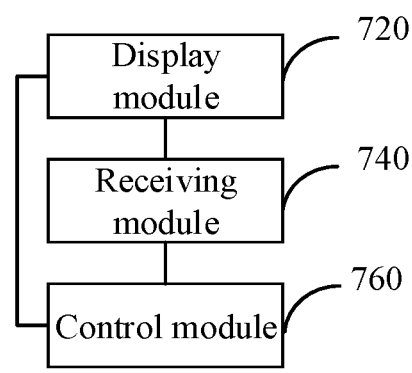
FIG. 7 is a structural block diagram of a key display apparatus according to some embodiments of the present disclosure.

FIG. 7 illustrates a structural block diagram of a key display apparatus according to some embodiments of the present disclosure. The key display apparatus may be implemented as all or a part of a terminal via software, hardware, or a combination of the software and the hardware. The key display apparatus may include: a display module 720, a receiving module 740, and a control module 760.

The display module 720 may be configured to display a first user interface and a navigation bar. In some embodiments, the navigation bar may include a target virtual key.

The receiving module 740 may be configured to receive a first operation signal.

The control module 760 may be configured to launch a target application in response to the first operation signal. In some embodiments, the target application may include a shooting function.

The display module 720 may be further configured to display a second user interface of the target application, and switch the target virtual key in the navigation bar to a shooting key. The shooting key may be configured to trigger the target application to perform shooting.

In some embodiments, the apparatus further may include a shooting module.

The receiving module 740 may be further configured to receive a touch signal triggered by a touch operation performed on the shooting key.

The shooting module may be configured to control or operate the target application to perform the shooting in response to the touch signal.

In some embodiments, the shooting module may be further configured to generate a pending intent message in response to the touch signal, and further send the pending intent message to the target application. The pending intent message may be configured to trigger the target application to start the shooting.

In some embodiments, the navigation bar may include a return key, a home key, and a menu key. The target virtual key may be the home key.

In some embodiments, the apparatus may further include a determining module.

The determining module may be configured to read a manifest file of an application in response to detecting that the application is launched, and determine that the launched application is the target application in response to a camera attribute existing in the manifest file.

The display module 720 may be further configured to switch to display from the target virtual key in the navigation bar to the shooting key in response to the launched application being the target application, or switch from the target virtual key in the navigation bar to the shooting key in response to the launched application being the target application and a foreground interface of the target application (that is, an interface of the target application that is running in the foreground) being a shooting interface.

In some embodiments, the receiving module 740 may be further configured to receive a second operation signal;

The control module 760 may be further configured to exit the target application in response to the second operation signal.

The display module 720 may be further configured to resume display of the target virtual key from the shooting key in the navigation bar, that is switch the shooting key in the navigation bar back to the target virtual key.

It should be noted that each of the foregoing modules may be implemented by a processor executing at least one instruction stored in a memory.

In some embodiments of the present disclosure, a non-transitory computer-readable medium may be further provided. The non-transitory computer-readable medium may store at least one instruction. The at least one instruction may be loaded and executed by the processor to perform the key display method according to the foregoing embodiments.

In some embodiments of the present disclosure, a computer program product may be further provided. The computer program product may store at least one instruction. The at least one instruction may be loaded and executed by the processor to perform the key display method according to the foregoing embodiments.

Those skilled in the art should be aware that, in one or more of the above examples, the functions described in some embodiments of the present disclosure may be implemented by hardware, software, firmware, or any combination thereof. When implemented by software, these functions may be stored in the computer-readable medium or transmitted as one or more instructions or codes in the computer-readable medium. The computer-readable medium may include a computer storage medium and a communication medium. The communication medium may include any medium that facilitates transmission of a computer program from one position to another position. The storage media may be any available media that is accessible by a general-purpose computer or a special-purpose computer.

The above may be only some embodiments of the present disclosure and may be not intended to limit the present disclosure. Any modification, equivalent replacement, or improvement made within the spirit and the principle of the present disclosure shall be included in the protection scope of the present disclosure.

What is claimed is:

1. A method for key display, comprising:
    displaying a first user interface and a navigation bar, the navigation bar comprising a plurality of virtual keys, and the plurality of virtual keys comprising a target virtual key;
    receiving a first operation signal;
    launching a target application in response to the first operation signal, the target application having a shooting function;
    displaying a second user interface of the target application, and switching the target virtual key in the navigation bar to a shooting key and continuously displaying the rest of the plurality of virtual keys, wherein the shooting key is configured to trigger the target application to perform shooting; and
    exiting the target application in response to one of the rest of the plurality of virtual keys being clicked.

2. The method according to claim 1, wherein the method further comprises:
    after switching the target virtual key in the navigation bar to the shooting key:
    receiving a touch signal triggered by a touch operation on the shooting key; and
    operating the target application to perform the shooting in response to the touch signal.

3. The method according to claim 2, wherein operating the target application to perform the shooting in response to the touch signal, comprises:
    generating a pending intent message in response to the touch signal; and
    sending the pending intent message to the target application; wherein the pending intent message is configured to trigger the target application to start the shooting.

4. The method according to claim 1, wherein the method further comprises:
    before switching the target virtual key in the navigation bar to the shooting key:
    in response to detecting that an application is launched, reading a manifest file of the launched application; and
    in response to a camera attribute existing in the manifest file, determining that the launched application is the target application;
    wherein switching the target virtual key in the navigation bar to the shooting key, comprises:
        switching the target virtual key in the navigation bar to the shooting key in response to the launched application being the target application, or
        switching the target virtual key in the navigation bar to the shooting key in response to the launched application being the target application and a foreground interface of the target application being a shooting interface.

5. The method according to claim 1, wherein displaying the second user interface of the target application comprises:
    in response to the target application being a camera application, directly switching the first user interface to the second user interface.

6. The method according to claim 1, wherein the method further comprises:
    after switching the target virtual key in the navigation bar to the shooting key:
    receiving a second operation signal;
    exiting the target application in response to the second operation signal and switching a shooting interface of the target application back to a home screen; and
    switching the shooting key in the navigation bar back to the target virtual key.

7. The method according to claim 6, wherein the plurality of virtual keys comprise a return key, a home key, and a menu key, and the target virtual key is the home key or the menu key; and
    receiving the second operation signal comprises:
        receiving the second operation signal in response to the return key being clicked.

8. The method according to claim 6, wherein displaying the second user interface of the target application comprises:
    removing a region of the first user interface and display the second user interface in the region.

9. The method according to claim 1, wherein switching the target virtual key in the navigation bar to the shooting key, comprises:
    removing the target virtual key in the navigation bar and displaying the shooting key at a position at which the target virtual key is located before removal; or
    keeping a displaying state of the target virtual key in the navigation bar unchanged, and switching a code logic configured to respond to the target virtual key to a code logic configured to respond to the shooting key.

10. A terminal, comprising a processor and a non-transitory memory, the non-transitory memory being configured to store at least one instruction which, when loaded and executed by the processor, perform a method for key display, the method comprising:
    displaying a first user interface and a navigation bar, the navigation bar comprising a plurality of virtual keys, and the plurality of virtual keys comprising a target virtual key;
    receiving a first operation signal;
    launching a target application in response to the first operation signal, the target application having a shooting function;
    displaying a second user interface of the target application, and switching the target virtual key in the navigation bar to a shooting key and continuously displaying the rest of the plurality of virtual keys; wherein the shooting key is configured to trigger the target application to perform shooting; and
    exiting the target application in response to one of the rest of the plurality of virtual keys being clicked.

11. The terminal according to claim 10, wherein the method further comprises:
    after switching the target virtual key in the navigation bar to the shooting key:
    receiving a touch signal triggered by a touch operation on the shooting key; and
    operating the target application to perform the shooting in response to the touch signal.

12. The terminal according to claim 11, wherein operating the target application to perform the shooting in response to the touch signal, comprises:
    generating a pending intent message in response to the touch signal; and
    sending the pending intent message to the target application; wherein the pending intent message is configured to trigger the target application to start the shooting.

13. The terminal according to claim 10, wherein the method further comprises:
    before switching the target virtual key in the navigation bar to the shooting key:

in response to detecting that an application is launched, reading a manifest file of the launched application;

in response to a camera attribute existing in the manifest file, determining that the launched application is the target application; and wherein switching the target virtual key in the navigation bar to the shooting key, comprises:

switching the target virtual key in the navigation bar to the shooting key in response to the launched application being the target application, or switching the target virtual key in the navigation bar to the shooting key in response to the launched application being the target application and a foreground interface of the target application being a shooting interface.

14. The terminal according to claim 10, wherein the method further comprises:

after switching the target virtual key in the navigation bar to the shooting key:

receiving a second operation signal;

exiting the target application in response to the second operation signal and switching a shooting interface of the target application back to a home screen; and switching the shooting key in the navigation bar back to the target virtual key.

15. The terminal according to claim 14, wherein the plurality of virtual keys comprise a return key, a home key and a menu key, and the target virtual key is the home key or the menu key; and receiving the second operation signal comprises:

receiving the second operation signal in response to the return key being clicked.

16. The terminal according to claim 14, wherein displaying the second user interface of the target application comprises: removing a region of the first user interface and display the second user interface in the region.

17. The terminal according to claim 10, wherein switching the target virtual key in the navigation bar to the shooting key, comprises:

removing the target virtual key in the navigation bar and displaying the shooting key at a position at which the target virtual key is located before removal; or keeping a displaying state of the target virtual key in the navigation bar unchanged, and switching a code logic configured to respond to the target virtual key to a code logic configured to respond to the shooting key.

18. A non-transitory computer-readable medium storing at least one instruction which, when loaded and executed by the processor to perform a method for key display comprising:

displaying a first user interface and a navigation bar, the navigation bar comprising a plurality of virtual keys, and the plurality of virtual keys comprising a target virtual key;

receiving a first operation signal;

launching a target application in response to the first operation signal, the target application having a shooting function;

displaying a second user interface of the target application, and switching the target virtual key in the navigation bar to a shooting key and continuously displaying the rest of the plurality of virtual keys; wherein the shooting key is configured to trigger the target application to perform shooting; and exiting the target application in response to one of the rest of the plurality of virtual keys being clicked.

19. The non-transitory computer-readable medium according to claim 18, wherein the method further comprises:

after switching the target virtual key in the navigation bar to the shooting key:

receiving a touch signal triggered by a touch operation on the shooting key; and operating the target application to perform the shooting in response to the touch signal;

wherein operating the target application to perform the shooting in response to the touch signal, comprises:

generating a pending intent message in response to the touch signal; and sending the pending intent message to the target application; wherein the pending intent message is configured to trigger the target application to start the shooting.

20. The non-transitory computer-readable medium according to claim 18, wherein the method further comprises:

before switching the target virtual key in the navigation bar to the shooting key:

in response to detecting that an application is launched, reading a manifest file of the launched application; and in response to a camera attribute existing in the manifest file, determining that the launched application is the target application;

wherein switching the target virtual key in the navigation bar to the shooting key, comprises:

switching the target virtual key in the navigation bar to the shooting key in response to the launched application being the target application, or switching the target virtual key in the navigation bar to the shooting key in response to the launched application being the target application and a foreground interface of the target application being a shooting interface.

* * * * *